US006990807B2

(12) United States Patent
Bird et al.

(10) Patent No.: US 6,990,807 B2
(45) Date of Patent: Jan. 31, 2006

(54) AUXILIARY HYDRAULIC DRIVE SYSTEM

(75) Inventors: Mark Bird, Clearwater, KS (US); David Moorman, Bedford, IN (US); Gary Cochran, Colwich, KS (US)

(73) Assignee: Coneqtec Corporation, Wichita, KS (US)

( * ) Notice: Subject to any disclaimer, the term of this patent is extended or adjusted under 35 U.S.C. 154(b) by 0 days.

(21) Appl. No.: 10/731,568

(22) Filed: Dec. 9, 2003

(65) Prior Publication Data

US 2004/0118115 A1 Jun. 24, 2004

Related U.S. Application Data

(60) Provisional application No. 60/431,927, filed on Dec. 9, 2002.

(51) Int. Cl.
*F16D 31/02* (2006.01)

(52) U.S. Cl. ........................... 60/468; 60/486; 60/422; 60/428

(58) Field of Classification Search .................. 60/421, 60/422, 428, 430, 468
See application file for complete search history.

(56) References Cited

U.S. PATENT DOCUMENTS

| | | | | |
|---|---|---|---|---|
| 3,940,930 A | * | 3/1976 | Rosander | 60/486 |
| 3,952,510 A | * | 4/1976 | Peterson | 60/486 |
| 4,121,501 A | * | 10/1978 | Finley | 60/486 |
| 4,141,280 A | * | 2/1979 | Lorimor | 60/486 |
| 4,354,420 A | * | 10/1982 | Bianchetta | 60/486 |
| 4,507,057 A | * | 3/1985 | Igarashi et al. | 60/486 |
| 4,558,629 A | * | 12/1985 | Unger et al. | 60/486 |
| 4,768,339 A | * | 9/1988 | Aoyagi et al. | 60/428 |
| 4,779,416 A | * | 10/1988 | Chatterjea et al. | 60/486 |
| 5,537,819 A | * | 7/1996 | Kobayashi | 60/468 |
| 5,680,760 A | * | 10/1997 | Lunzman | 60/468 |
| 6,173,572 B1 | * | 1/2001 | Cobo et al. | 60/468 |
| 6,293,099 B1 | * | 9/2001 | Kamiya | 60/486 |
| 6,293,765 B1 | * | 9/2001 | Peterson | 60/428 |
| 6,305,162 B1 | * | 10/2001 | Cobo et al. | 60/422 |
| 6,360,538 B1 | * | 3/2002 | McGowan et al. | 60/468 |
| 6,430,850 B1 | * | 8/2002 | VanDerZyl et al. | 60/486 |
| 6,789,387 B2 | * | 9/2004 | Brinkman | 60/414 |

* cited by examiner

*Primary Examiner*—Thomas E. Lazo
(74) *Attorney, Agent, or Firm*—Woodard, Emhardt, Moriarty, McNett & Henry LLP

(57) ABSTRACT

One preferred embodiment of the present invention, provides an auxiliary hydraulic drive system having a total hydraulic flow. The system includes a primary hydraulic pump operable to provide hydraulic flow for an implement, and a flow control valve in communication with the hydraulic flow. The flow control valve operates to allow an optimum flow rate and diverts the excess flow amount when the total hydraulic flow exceeds the optimum flow rate. A secondary hydraulic pump is selectively operable to provide additional hydraulic flow. A control system is operable to engage the secondary pump when the total hydraulic flow drops below a minimum flow level; and the control system operates to disengage the secondary pump when the total hydraulic flow exceeds a maximum flow level. In a further embodiment, the invention provides a control unit for a hydraulic system. The control unit includes a sensor to measure total hydraulic fluid flow in a system; and a controller coupled to the sensor. The controller is operable to initiate additional fluid flow in the system if the total fluid flow drops below a minimum; and, is operable to reduce the fluid flow in the system if the total fluid flow exceeds a maximum.

24 Claims, 7 Drawing Sheets

AUXILIARY HYDRAULIC DRIVE
System Flow vs Engine Speed
Rated Engine Speed 2200 RPM
On increasing engine speed second pump cuts out at 1900 RPM
Large Pump Flow
Optimum Flow Rate
Small Pump Minus Hitch Flow
Combined Flow
On decreasing engine speed second pump cuts in at 1750 RPM
Still has usable hydraulic power at engine peak torque 1200 RPM
Pump Flow (GPM)
35
30
25
20
15
10
5
0
Engine Speed (RPM)
1200
1250
1300
1350
1400
1450
1500
1550
1600
1650
1700
1750
1800
1850
1900
1950
2000
2050
2100
2150
2200
2250
2300
2350
2400

FIGURE 6 Engine Speed vs System Flow

| Optimal Flow | Engine Speed | Large Pump only | Small Pump Minus Hitch | Small Pump Status | Combined Pumps Minus Hitch | Increasing RPM | Decreasing RPM |
|---|---|---|---|---|---|---|---|
| gal/ min | RPM | Rated Flow | Rated Flow | Engine Speed rising/falling | Total Rated Flow | Actual Flow | Actual Flow |
| 26 | 1200 | 14.9 | 5.0 | On | 19.9 | 19.9 | 19.9 |
| 26 | 1250 | 15.5 | 5.3 | On | 20.8 | 20.8 | 20.8 |
| 26 | 1300 | 16.2 | 5.6 | On | 21.8 | 21.8 | 21.8 |
| 26 | 1350 | 16.8 | 5.9 | On | 22.7 | 22.7 | 22.7 |
| 26 | 1400 | 17.4 | 6.2 | On | 23.6 | 23.6 | 23.6 |
| 26 | 1450 | 18.0 | 6.5 | On | 24.5 | 24.5 | 24.5 |
| 26 | 1500 | 18.6 | 6.8 | On | 25.5 | 25.5 | 25.5 |
| 26 | 1550 | 19.3 | 7.1 | On | 26.4 | 26.4 | 26.4 |
| 26 | 1600 | 19.9 | 7.4 | On | 27.3 | 27.3 | 27.3 |
| 26 | 1650 | 20.5 | 7.7 | On | 28.2 | 28.2 | 28.2 |
| 26 | 1700 | 21.1 | 8.0 | On | 29.1 | 29.1 | 29.1 |
| 26 | 1750 | 21.8 | 8.3 | On | 30.1 | 30.1 | 30.1 |
| 26 | 1800 | 22.4 | 8.6 | On/Standby | 31.0 | 31.0 | 22.4 |
| 26 | 1850 | 23.0 | 8.9 | On/Standby | 31.9 | 31.9 | 23.0 |
| 26 | 1900 | 23.6 | 9.2 | Standby | 32.8 | 32.8 | 23.6 |
| 26 | 1950 | 24.2 | 9.5 | Standby | 33.8 | 24.2 | 24.2 |
| 26 | 2000 | 24.9 | 9.8 | Standby | 34.7 | 24.9 | 24.9 |
| 26 | 2050 | 25.5 | 10.1 | Standby | 35.6 | 25.5 | 25.5 |
| 26 | 2100 | 26.1 | 10.4 | Standby | 36.5 | 26.1 | 26.1 |
| 26 | 2150 | 26.7 | 10.7 | Standby | 37.5 | 26.7 | 26.7 |
| 26 | 2200 | 27.3 | 11.0 | Standby | 38.4 | 27.3 | 27.3 |
| 26 | 2250 | 28.0 | 11.3 | Standby | 39.3 | 28.0 | 28.0 |
| 26 | 2300 | 28.6 | 11.6 | Standby | 40.2 | 28.6 | 28.6 |
| 26 | 2350 | 29.2 | 11.9 | Standby | 41.1 | 29.2 | 29.2 |
| 26 | 2400 | 29.8 | 12.2 | Standby | 42.1 | 29.8 | 29.8 |

| | Displacement $IN^3$ |
|---|---|
| 570 Pump = | 3.19 |
| Second pump = | 1.55 |
| Combined = | 4.74 |
| Flow for 3 Point Hitch = | 2.5 |
| Pump Efficiency = | 90% |

| HP Savings at 2100 RPM | |
|---|---|
| 36.5 | Total rated flow |
| 26 | Large pump actual flow |
| 10.5 | Difference in flows |
| 3000 | Pressure |
| 27.6 | Horsepower |

AUXILIARY HYDRAULIC DRIVE SYSTEM

This application claims priority to provisional application Ser. No. 60/431,927 filed Dec. 9, 2002, which is incorporated herein by reference.

FIELD OF THE INVENTION

This invention relates to an auxiliary hydraulic drive system for powering a hydrostatic power take off ("PTO") and/or for directly powering a hydraulically driven auxiliary implement.

BACKGROUND OF THE INVENTION

Many agricultural and industrial prime movers are equipped with auxiliary implement drive systems which are powered by mechanically driven power take-offs or directly connected hydraulic power. A non-limiting list of typical implements includes rotary and flail mowers, snow blowers, rotary tillers, landscape preparators, trenchers, etc. Typically implements have a required horsepower rating based on power take off speeds of either 540 or 1000 rpm. Optimal operation of these implement systems requires a sufficient amount of horsepower at the rated speed being transmitted to the implement combined with a suitable ground speed and resulting feed rate. The ground speed and resulting feed rate to the implement depend on transmission and gear/speed selection. With the current conventional drive systems, an ideal or optimal application would have the prime mover (for example a tractor, back-hoe, bulldozer, or skid/steer loader) operated at a constant engine speed so as to optimize the implement input horsepower. In very few circumstances is this ideal possible.

In most combinations, the horsepower supplied to the implement is directly related to the prime mover's engine speed. Typical transmissions and gears are in fixed proportions. Therefore when the engine speed slows, so does the supplied horsepower and speed of the implement. A sufficiently slow ground speed can result in a reduction in supplied horsepower below the implement's rating, resulting in a drop in the implement's efficiency.

Prime movers with mechanical or conventional hydrostatic power take off or hydrostatic/hydraulic drive system have some functional disadvantages:

One common disadvantage of conventional power take-offs, either mechanical or hydraulic, is that the auxiliary implement speed and relating drive horsepower are directly proportional to the prime mover engine speed. As an example, when the vehicle/engine speed is slowed for improved and safe maneuverability, the auxiliary implement loses operating efficiency and inertia, resulting in poorer performance and overloading the prime mover engine. Currently this must be overcome by methods such as disengaging the ground drive and speeding up the engine, selecting a low ground speed (gear), or reducing the load on the implement. For a mower or flail, a reduced load is typically done by raising the implement's height, resulting in less output and/or requiring multiple applications of the implement.

Another typical disadvantage of conventional power take-offs is that if a reduction in feed rate to the implement is required due to heavier than normal conditions, the operator must make a ground speed reduction via the vehicle transmission (gear change) due to the fact a simple ground speed reduction via engine speed results in a proportional drop off in power to the implement thus potentially overloading the prime mover engine.

Certain embodiments of the present invention address these and other needs.

SUMMARY OF THE INVENTION

One preferred embodiment of the present invention provides an auxiliary hydraulic drive system including a hydraulic pump operable to provide hydraulic flow for an implement having an optimum flow level. A flow control valve is in communication with the hydraulic flow, wherein the flow control valve operates to divert excess flow above the optimum flow level away from the implement. Preferably the flow control valve reduces the amount of diverted flow as the hydraulic flow from the hydraulic pump is reduced.

An alternate preferred embodiment provides an auxiliary hydraulic drive system having a total hydraulic flow. The system includes a primary hydraulic pump operable to provide hydraulic flow for an implement, and a flow control valve in communication with the hydraulic flow. The flow control valve operates to allow an optimum flow rate and diverts the excess flow amount when the total hydraulic flow exceeds the optimum flow rate. A secondary hydraulic pump is selectively operable to provide additional hydraulic flow. A control system is operable to engage the secondary pump when the total hydraulic flow drops below a minimum flow level; and the control system operates to disengage the secondary pump when the total hydraulic flow exceeds a maximum flow level.

In a still further embodiment, the invention provides a control unit for a hydraulic system. The control unit includes a sensor to measure total hydraulic fluid flow in the system, and a controller coupled to the sensor. The controller is operable to initiate additional fluid flow in the system if the total fluid flow drops below a minimum, and is operable to reduce the fluid flow in the system if the total fluid flow exceeds a maximum.

Objects, features and advantages of the present invention shall become apparent from the detailed drawings and descriptions provided herein.

BRIEF DESCRIPTION OF THE DRAWINGS

FIG. 6 is a System Flow v. Engine Speed chart corresponding to FIG. 5.

DESCRIPTION OF PREFERRED EMBODIMENTS

Figure 1:
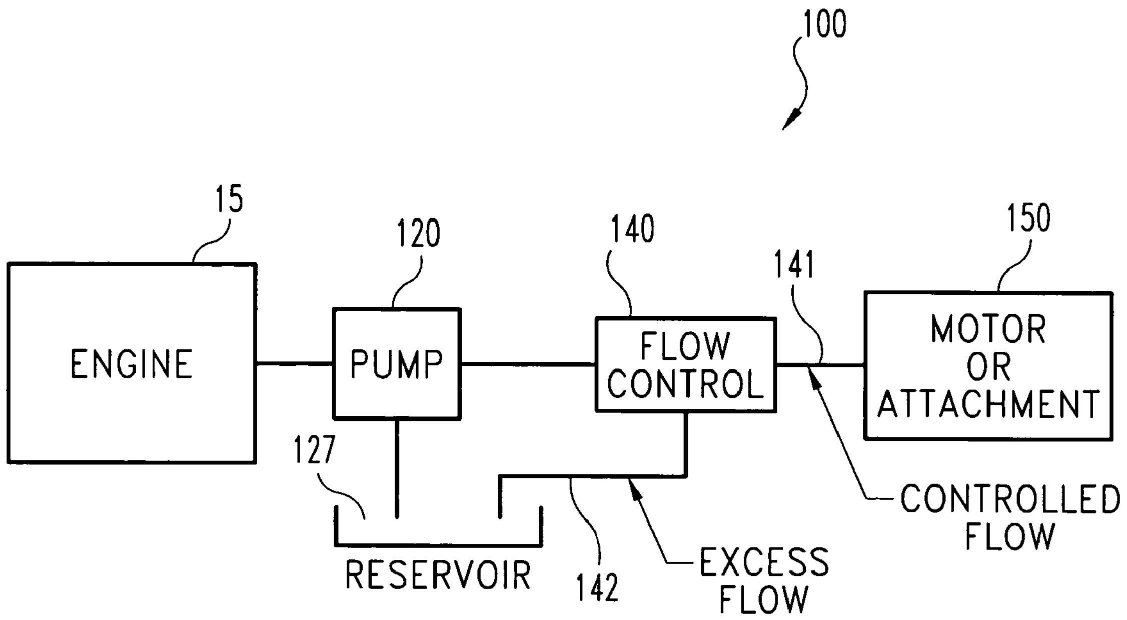
FIG. 1 is a schematic drawing of one preferred embodiment of the present invention.

For the purposes of promoting an understanding of the principles of the invention, reference will now be made to the embodiments illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

In certain embodiments, the present invention provides a system and method for transmitting power from an engine to an auxiliary implement, preferably a hydraulically driven implement. At the basic level, such a system typically includes or is connected to a prime mover with an engine, which is coupled via a transmission to a hydraulic pump. The hydraulic pump draws hydraulic fluid from a reservoir and pumps it under pressure to the implement to provide power to the implement. The implement may be directly connected to the hydraulic circuit or connected to a PTO mechanism. After the hydraulic fluid powers the implement, it is returned to the reservoir for re-use. In preferred embodiments, the present invention provides a system and method for providing optimum fluid flow and thus substantially consistent horsepower to the implement while the engine speed varies.

Examples of prime movers include bulldozers, back-hoes, tractors, skid-steer loaders, or other, typically movable, machinery. The prime mover typically includes an engine which varies in engine speed in relation to the rate of use, speed or feed rate of the prime mover. The engine may include a geared transmission. Typically, as the engine load increases, the engine speed decreases until the engine stops, the load is reduced or the engine is shifted to a different available gear. The present invention provides a system for powering an implement which takes power from the engine and allows the engine to vary in speed without a necessarily corresponding variance in implement power.

There are several advantages to allowing the ability to reduce the engine speed of the prime mover without a directly proportional reduction in implement speed and related performance. Some of these advantages are lowering the feed rate to the implement, improved vehicle maneuverability, improved fuel efficiency, noise and engine wear reduction, and improved engine cooling. These advantages may accrue with various transmission types from the engine to ground drive, i.e. mechanical, torque converter, or infinitely variable hydrostatic, and may also accrue whether with various implement drive systems, i.e. hydrostatic PTO or a conventional hydrostatic/hydraulic direct connection. The present invention is not dependent on the transmission type.

The present invention eliminates certain disadvantages while supplying a larger percentage of the available/reserve engine horsepower to the implement at lower engine speeds. This is done by providing relatively constant hydraulic flow (i.e., supplied horsepower) at an optimum level, therefore providing a substantially constant implement speed over a wider engine speed range. This allows the implement to maintain performance when the engine speed is reduced.

In alternate embodiments, the present invention may supply hydraulic power via flow and pressure to a hydrostatic power take off (“PTO”) coupling which is mechanically coupled to an implement, or the invention may directly supply hydraulic power to a hydraulically powered implement via an internal or external hydraulic conduit. The methods of connection include, for example, quick-disconnects, manual on/off valves, and/or direct connections. References to PTO or direct connection embodiments herein are for convenience, and are intended to refer to any connection method.

In one preferred embodiment, illustrated schematically in FIG. 1, the system 100 includes the engine 15 which is in the prime mover, at least one hydraulic pump 120, at least one flow control valve 140 and at least one PTO motor or attachment 150. One example of an engine to implement connection is a torque converter style transmission.

In the embodiment illustrated in FIG. 1, the pump 120 is driven by the engine 15 and is sufficiently sized to provide hydraulic fluid flow in excess of the optimum PTO motor/attachment 150 requirements when the engine is at ideal RPM. When the pump is delivering flow, the flow control valve 140 allows hydraulic fluid flow 141 to the PTO at a rate up to a set optimal flow rate, and then diverts any excess flow 142 and the corresponding heat to the fluid reservoir 127. As the engine speed decreases, the flow control will re-allocate diverted excess flow 142 back to the PTO to maintain an optimal flow to the motor until the total flow in the system drops below the optimal amount. Once all the flow is directed to the PTO, further engine speed decreases result in a proportional drop in flow to the PTO. This system provides a PTO drive system that will maintain a substantially constant drive speed over a larger range of engine RPMs.

Figure 2:
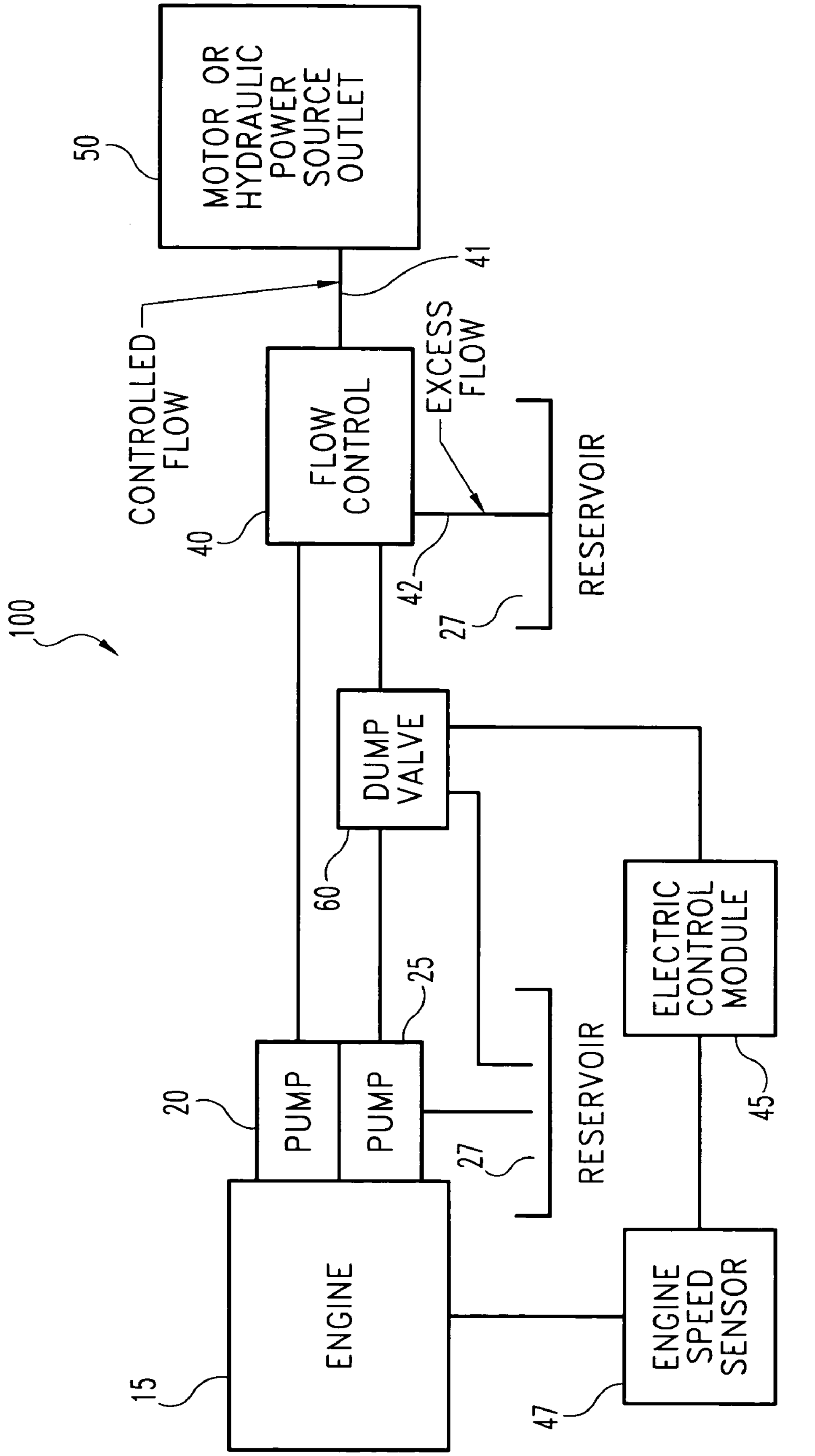
FIG. 2 is a schematic drawing of an alternate preferred embodiment of the present invention.

In an alternate preferred embodiment, illustrated schematically in FIG. 2, the system 10 includes at least two pumps 20 and 25 connected to the prime mover’s engine 15, at least one dump valve 60, at least one flow control valve 40, a control module 45, and at least one motor or hydraulic power source outlet (PTO) 50.

In the preferred embodiment illustrated in FIG. 2, the primary pump 20 is sized to provide a hydraulic flow greater than the PTO’s optimum flow at the engine’s optimal speed. As in the prior embodiment, preferably when the engine 15 and primary pump 20 are operating at ideal conditions, the flow control valve 40 provides optimal hydraulic flow 41 to the PTO and diverts any excess flow 42 flow back to the hydraulic fluid reservoir 27.

As the engine speed is reduced, the output from the primary pump 20 is reduced until the engine 15 and primary pump 20 reach a pre-set minimum threshold. The electronic control module (ECM) 45 and an engine speed sensor 47 determine when the minimum threshold is reached and initiate the second pump 25. When initiated, output from the second pump 25 is added to the output from the primary pump to increase the system’s total flow. The secondary pump typically has an hydraulic output less than the primary pump’s output, but preferably has sufficient capacity, at the engine’s reduced speed, to raise the total hydraulic flow to a value greater than the PTO’s optimal hydraulic flow. When the total hydraulic flow exceeds the PTO’s optimal needs, the flow control 40 again diverts any excess flow and heat to the reservoir.

If the engine speed continues to decline, both pumps jointly operate to supply fluid to the PTO. Flow control 40 allocates the fluid flow, if possible, to maintain an optimal flow to the implement. If the total system flow drops below the PTO’s optimal needs, the hydraulic flow and horsepower to the PTO will eventually decrease.

If the engine speed increases, the primary and secondary pumps jointly increase their output, with excess diverted, until the ECM 45 and sensor 47 determine that the primary pump’s output alone is sufficient for the PTO’s needs. The secondary pump 25 is then returned to a disengaged or stand-by state. In certain embodiments, the secondary pump 25 runs at a minimal level while not engaged, and the dump valve 60 diverts any flow to an alternate use or the reservoir.

In preferred embodiments, the flow control valve 40 is adjustable so that various selectable flow rates can be delivered from the system to the hydraulically driven attachments. Various flow rates may be desired based on the specific attachment in use.

In one preferred embodiment, the ECM 45 and sensor 47 are calibrated to the engine 15 and pumps 20 and 25, so that the individual pump and total system hydraulic fluid flow can be calculated from a known engine speed. In alternate preferred embodiments, a fluid flow sensor or sensors directly measure the fluid flow from each pump and/or the total fluid flow in the system.

In further preferred embodiments, two or more output pumps and controls are used in the system and the electronic control module is triggered by various other means such as, but not limited to, flow, torque or pressure sensors. In one embodiment, multiple pumps are used and each pump preferably has a set output rate. The individual pumps are initiated or disengaged when the corresponding marginal output is needed or no longer needed, as appropriate. Multiple pumps with smaller output rates can be used to minimize the excess system flow in a given configuration.

In a still further preferred embodiment, variable output pumps are used for the primary and/or secondary pumps. With variable output pumps, the ECM senses the engine speed or pump flow and the PTO requirements and then dynamically raises or lowers each pump's output to match the PTO's need, eliminating the need for a separate flow control valve and the diversion of excess fluid to the reservoir.

Figure 3:
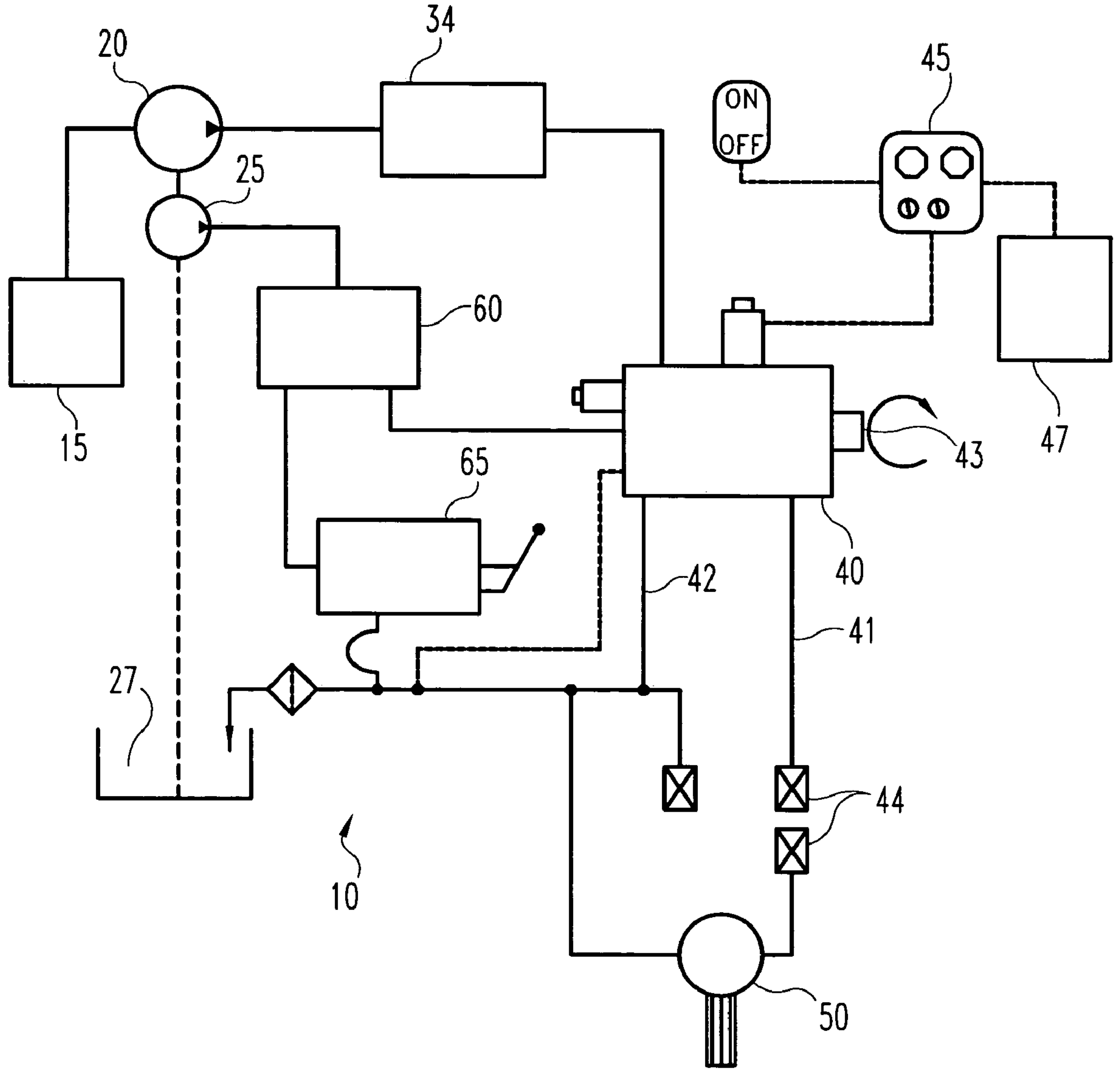
FIG. 3 is a more detailed schematic of the embodiment of FIG. 2.

System 10 is illustrated with more detail in FIG. 3. Attached to engine 15 via a transmission are a primary pump 20 and a secondary pump 25. Primary pump 20 and secondary pump 25 draw hydraulic fluid from reservoir 27. Primary pump 20 feeds hydraulic fluid to control valve 40. Control valve 40 communicates with an electronic control module 45 and allows hydraulic fluid to flow 41 via coupling 44 to PTO/attachment accessory 50. Fluid returns from accessory 50, after use, to reservoir 27.

As a second loop, secondary pump 25 feeds a three point flow control valve 60 which controls fluid flow to control valve 40 and to a second accessory valve 65, such as a three point hitch height adjuster. In this embodiment, control valve 60 has a priority flow to the second accessory, wherein the priority flow is preferably substantially less than the secondary pump's output. After use in the second accessory, hydraulic fluid returns to reservoir 27.

FIG. 3 also illustrates a loader valve 34 which can optionally be operated to divert flow to an initial accessory, such as a front end loader (not shown), with the excess power accessible to the system 10. Loader valve 34 is not necessary to system 10.

Control valve 40 may be adjusted by control 43 to provide different flow rates for accessories as desired, such as 8, 13, 18, 22, 26 and 30 gal/min. When alternate flow rates are selected, the primary and secondary pump parameters can be varied as desired to maintain optimum performance for system 10.

Figure 4:
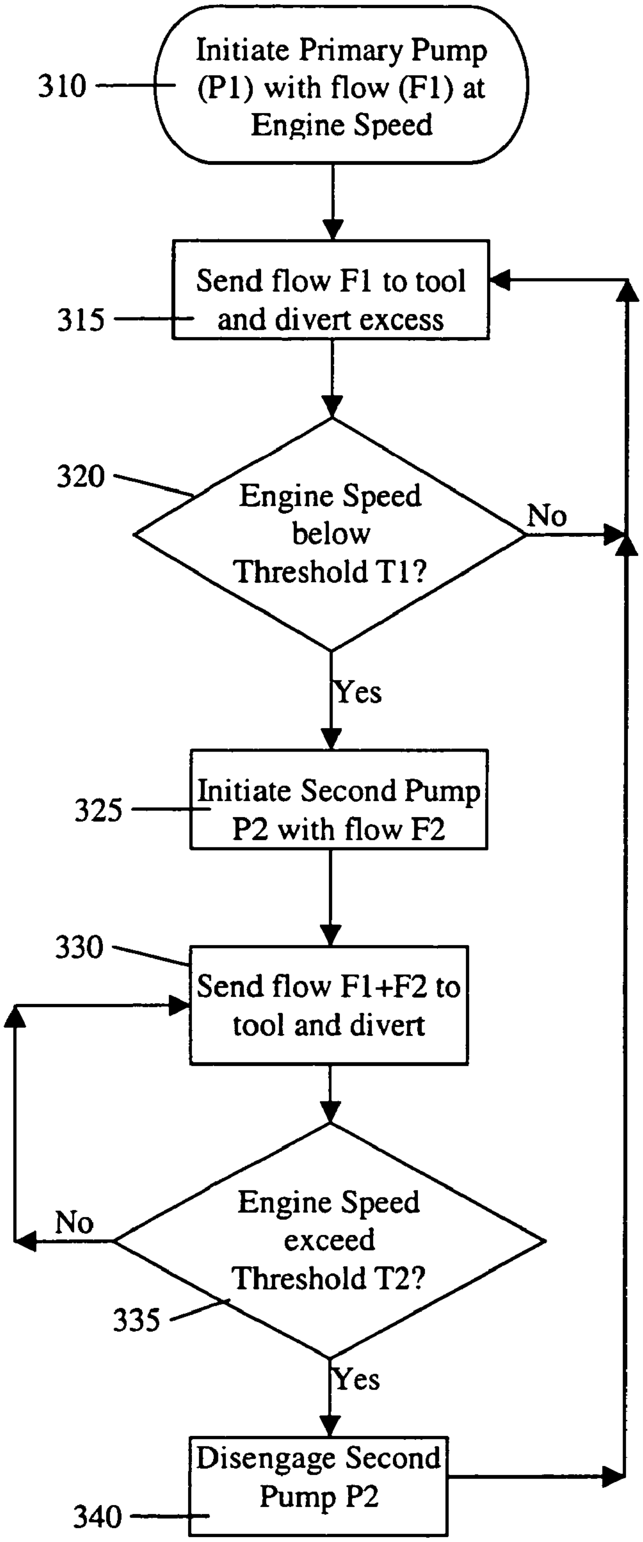
FIG. 4 is a control logic flow chart for the embodiment of FIG. 2.

A flow chart of the control logic in system 10 is illustrated in FIG. 4. At the initial stage 310, the primary pump P1 with flow F1 is initiated at the standard engine speed. Flow F1 is sent to the implement or tool with the excess diverted, step 315. The system is then monitored, step 320, to determine if total fluid flow drops below a pre-set threshold T1. If the total flow has not dropped below T1, the system achieves a steady state.

If the system drops below T1, step 325 initiates second pump P2 with flow F2. The total fluid flow F1+F2 is sent to the tool, with any excess diverted, step 330. The system continues to be monitored, step 335, to determine if the total flow rises to exceed a ceiling threshold T2. So long as the system remains below T2, the system achieves a steady state. If threshold T2 is exceeded, the system disengages second pump P2 and returns to only pump P1 supplying flow F1 to the tool.

Figure 5:
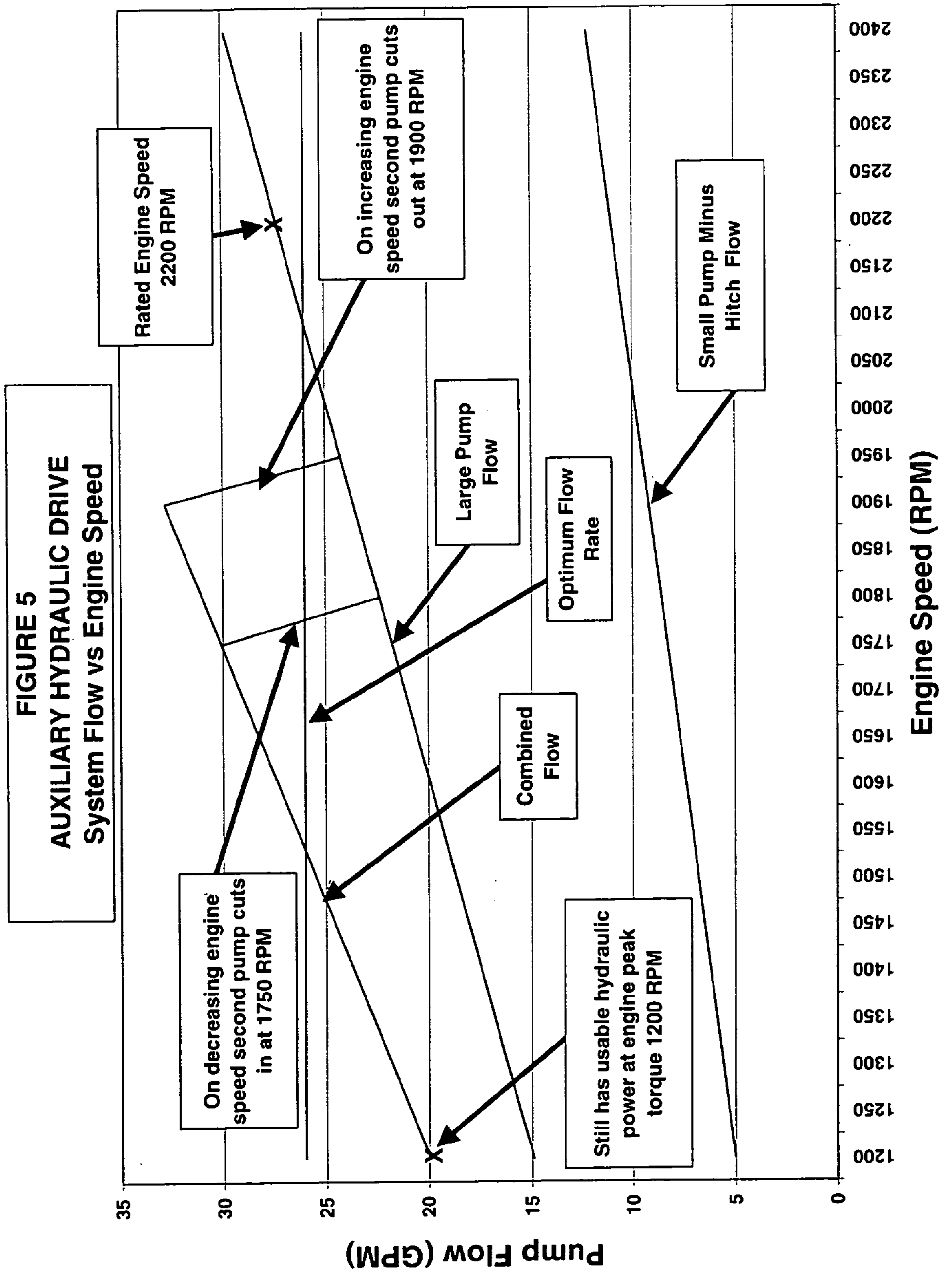
FIG. 5 is a System Flow v. Engine Speed graph for one example embodiment.

The set-up of FIG. 3 is discussed with example numbers illustrated in a chart showing Pump Flow versus Engine Speed in FIG. 5 and a corresponding data table in FIG. 6. In one arrangement, engine 15 has an optimum speed of 2200 rpm at which speed primary pump 20 provides an output of 27.3 gal/min. (One model for this primary pump is supplied by Commercial Intertech.) In this scenario, accessory 50 optimally draws fluid at a rate of 26 gal/min. The 27.3 gal/min flow from primary pump 20 enters control valve 40 which is pre-set so that a maximum of 26 gal/min is provided to accessory 50. Excess flow 42 of 1.3 gal/min is returned to reservoir 27. Secondary pump 25 is in a standby or minimal operation state to provide power to secondary accessory 65 (for example at 4 gal/min), with excess flow returning directly to the reservoir. By way of example, primary pump has a relief valve set between 3000 to 3100 psi and control valve 40 has a relief valve set a 2950 psi.

When the engine 15 encounters a load which detracts from its optimal speed, the flow from primary pump 20 is reduced in proportion to the engine's decrease in speed and the excess flow being diverted by control valve 40 is re-directed to accessory 50 to maintain the flow as close as possible (within variances) to an optimal 26 gal/min flow. When an engine sensor 47 detects that the engine speed has slowed to a preset threshold, such as 1750 rpm, where it is determined that the total system flow from only primary pump 20 is insufficient, an electronic controller 45 initiates secondary pump 25. (A model for a suitable secondary pump is supplied by Sauer-Danfoss.) Secondary pump 25 provides a flow supply which is combined with the flow supplied from primary pump 20 to raise the total system flow.

The total flow supply from primary pump 20 plus secondary pump 25 is preferably greater than needed for accessory 50, with the excess 42 over the accessory requirements diverted by valve 40 as fluid and heat. For example, as illustrated by the flow data in FIG. 5, secondary pump 25 may have a capacity up to 15 gal/min at optimum speed of 2200 rpm (minus a 4 gal/min priority flow to a second accessory) for a net secondary pump flow of 11 gal/min. At the reduced engine speed of 1750 rpm, secondary pump 25 supplies a net flow of 8.3 gal/min, added to an output of 21.8 gal/min from the primary pump 20, resulting in a total flow of 30.1 gal/min. As engine 15 increases in speed, the flow from both pumps increases until a ceiling point such as at 1900 rpm is reached, (FIGS. 4 and 5) where primary pump 20 has sufficient flow alone to supply the accessory. At this point, secondary pump 25 is disengaged and returned to a standby state. By using embodiments of the present invention the optimal operating range for the engine and accessory can be extended while allowed independent speed management for the engine and the accessory.

Figure 7A:
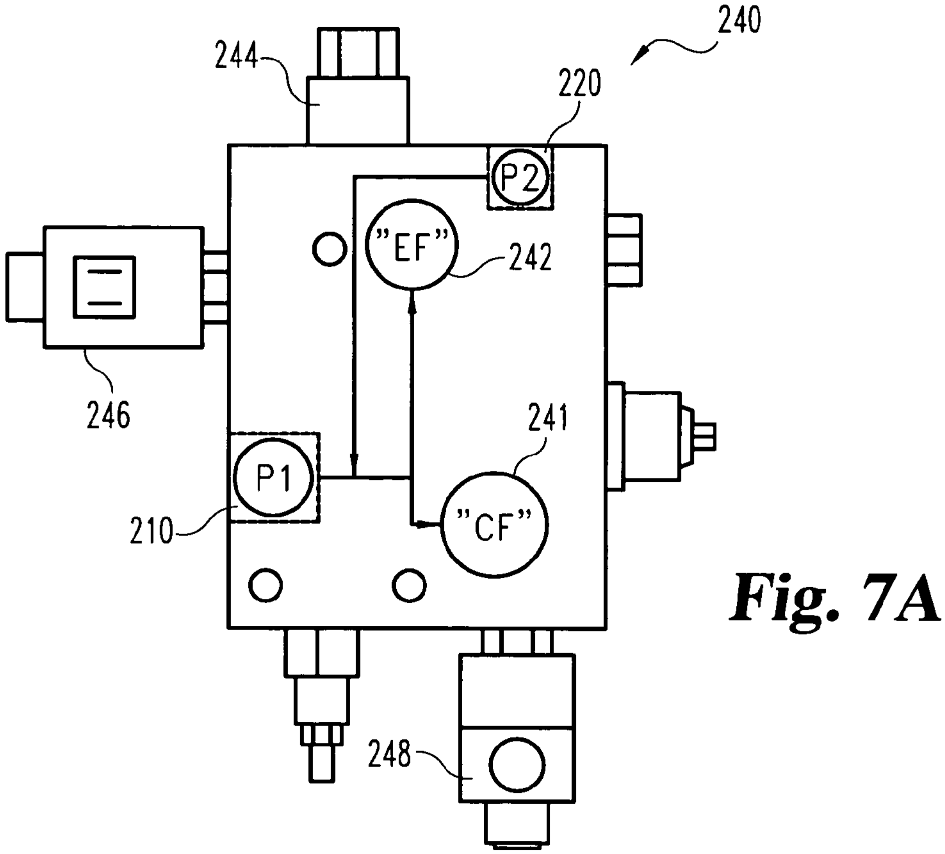
FIGS. 7A and B are top and side views of a control valve useful in certain preferred embodiments.
Figure 7B:
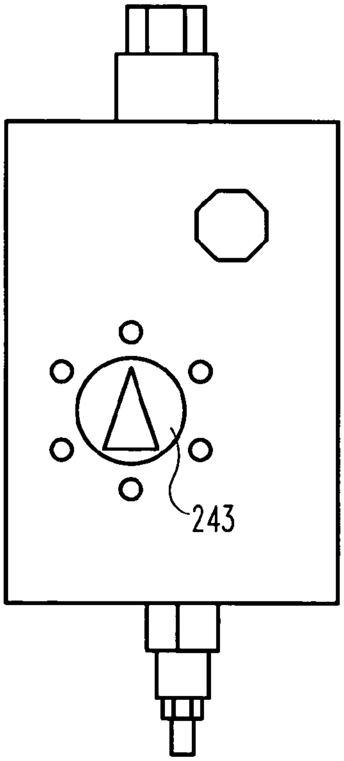

A diagram of a Coneqtec C85 valve assembly 240 is shown in FIGS. 7A and 7B. The valve assembly 240 may be used as control valve 40 in system 10. The valve assembly 240 includes first pump input 210 and second pump input 220. The valve includes a controlled flow output 241 typically leading to an implement and an excess flow output 242 leading to a reservoir. The controlled flow output amount is set using control 243. The valve may include a logic cartridge 244 for allocating input flow between the controlled and excess flows and can mount control module 246 coupled to a second pump to engage or disengage the pump. Preferably the valve assembly includes safety features such as a manual override 248, a relief valve and/or an over running check valve. Valve assembly 240 includes internal valves for dynamically allocating the input flow(s) versus controlled and excess output flow, and may use known mechanical valves such as ball, gate, screw or butterfly valves.

In an alternate preferred embodiment, secondary pump 25 and/or primary pump 20 are continuously variable output pumps. With a continuously variable pump(s), the pump output is controlled to maintain a constant output to the accessory while engine speed varies. In alternate embodiments, multiple pumps are used in the control logic with each pump engaged or disengaged as the system fluid flow falls below or exceeds certain thresholds.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An auxiliary hydraulic drive system, comprising:

a) a hydraulic pump operable to provide hydraulic flow for an implement having an optimum flow level; and, b) a flow control valve located in the path of said hydraulic flow between said pump and the implement, wherein said flow control valve operates to divert excess flow above the substantially constant optimum flow level, wherein said excess flow is diverted from said valve to an excess flow output leading to a reservoir.

2. The system of claim 1 where said flow control valve reduces the amount of diverted flow as the hydraulic flow from said hydraulic pump is reduced.

3. An auxiliary hydraulic drive system having a total hydraulic flow, comprising:

a) a primary hydraulic pump operable to provide hydraulic flow for an implement;

b) a flow control valve in communication with said hydraulic flow, wherein said flow control valve operates to allow substantially constant optimum flow rate within an optimal flow range and diverts the excess flow amount when the total hydraulic flow exceeds said optimum flow rate;

c) a secondary hydraulic pump selectively switchable from a standby state with at most minimal pump flow to an engaged state with substantial pump flow to provide additional hydraulic flow to the system;

d) a control system operable to engage said secondary pump when the total hydraulic flow drops below a minimum flow level; and e) wherein said control system operates to disengage said secondary pump when the total hydraulic flow exceeds a maximum flow level.

4. The system of claim 3 wherein said control system comprises a fluid flow valve.

5. The system of claim 4 wherein said control system further comprises a sensor to detect the total hydraulic flow.

6. The system of claim 5 wherein said sensor is an engine speed sensor.

7. The system of claim 5 wherein said sensor is a direct fluid flow sensor.

8. The system of claim 5 wherein said control system is selectively adjustable to a plurality of flow rates.

9. The system of claim 3 further comprising at least a third hydraulic pump operable by said control system and switchable from a standby state with at most minimal pump flow to an engaged state with substantial pump flow to provide additional hydraulic flow.

10. A fluid flow system, comprising:

a) a sensor to measure total fluid flow in a system;

b) a valve operable to divert fluid flow beyond substantially constant optimum level, wherein said valve diverts the excess flow to an excess flow output leading to a reservoir; and, c) a controller coupled to said sensor and operating said valve to reduce the amount of diverted flow in response to a drop in total fluid flow.

11. The system of claim 10 further comprising at least one pump, operable by said controller, to provide fluid flow to the system.

12. A control unit for a hydraulic system, comprising:

a) a sensor to measure total hydraulic fluid flow in a system;

b) a controller coupled to said sensor and operable to initiate additional fluid flow in the system if the total fluid flow drops below a minimum, wherein initiating additional fluid flow includes switching at least one secondary pump from a standby state with at most minimal pump flow to an engaged state with substantial pump flow; and, c) wherein said controller is operable to reduce the fluid flow in the system if the total fluid flow exceeds a maximum.

13. The control unit of claim 12 wherein said sensor is an engine speed sensor.

14. The control unit of claim 12 wherein said sensor is a fluid flow sensor.

15. The control unit of claim 12 wherein said controller is operable to initiate additional fluid flow by serially engaging two or more secondary hydraulic pumps from a standby state with at most minimal pump flow to an engaged state with substantial pump flow.

16. The control unit of claim 12 wherein said controller is operable to reduce the fluid flow by disengaging at least one hydraulic pump.

17. The control unit of claim 12 wherein said controller is operable to initiate additional flow or reduce fluid flow by adjusting the output of one or more variable output pumps.

18. The control unit of claim 12 wherein said control unit is operable to selectively combine the flows from more than one pump.

19. The control unit of claim 18 wherein said control unit is operable to divert excess flow when the combined flows exceed an optimal flow rate.

20. A method of providing hydraulic power to an implement having an optimum fluid flow level, comprising the steps of;

a) providing substantially constant hydraulic fluid flow to an implement having an optimum flow level;

b) monitoring the total hydraulic fluid flow;

c) diverting excess hydraulic fluid flow above the optimum level from said valve to an excess flow output leading to a reservoir; and, d) increasing the hydraulic fluid flow if the total hydraulic fluid flow drops below a minimum.

21. The method of claim 20 further comprising the step of reducing the hydraulic fluid flow if the total hydraulic fluid flow exceeds a maximum.

22. The method of claim 21 wherein the step of increasing the hydraulic fluid flow includes engaging at least one pump from a standby state with at most minimal pump flow to an engaged state with substantial pump flow.

23. The method of claim 21 wherein the step of reducing the hydraulic fluid flow includes disengaging at least one pump.

24. The method of claim 20 wherein the step of monitoring the total hydraulic fluid flow includes an engine speed sensor.

* * * * *